United States Patent
Nakano

(10) Patent No.: US 6,735,105 B2
(45) Date of Patent: May 11, 2004

(54) SEMICONDUCTOR CIRCUIT SUPPLIED WITH A VARYING POWER SUPPLY VOLTAGE, AND METHOD FOR OPERATING THE SAME

(75) Inventor: Hiroo Nakano, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/277,050

(22) Filed: Oct. 22, 2002

(65) Prior Publication Data

US 2003/0075735 A1 Apr. 24, 2003

(30) Foreign Application Priority Data

Oct. 22, 2001 (JP) ........................................ 2001-323881

(51) Int. Cl.[7] ................................................ G11C 5/02
(52) U.S. Cl. ............................. 365/52; 365/51; 365/226
(58) Field of Search ............................. 365/51, 52, 226

(56) References Cited

U.S. PATENT DOCUMENTS

| | | | | |
|---|---|---|---|---|
| 5,329,491 A | * | 7/1994 | Brown et al. ........... | 365/185.33 |
| 5,828,892 A | * | 10/1998 | Mizuta ....................... | 713/300 |
| 6,035,357 A | | 3/2000 | Sakaki ....................... | 710/301 |
| 6,667,928 B2 | * | 12/2003 | Honma et al. .............. | 365/226 |

* cited by examiner

Primary Examiner—Son Mai
(74) Attorney, Agent, or Firm—Finnegan, Henderson, Farabow, Garrett & Dunner, L.L.P.

(57) ABSTRACT

A semiconductor circuit having a power supply voltage detection circuit to detect a potential level of an external power supply voltage and to output a detection signal depending on a comparison result with the potential level. A system control circuit detects the detection signal, outputs a status signal and an interrupt signal, and outputs a clock selection signal in response to an operation control signal. A CPU outputs the operation control signal to the system control circuit in response to the status signal and the interrupt signal. A clock generation circuit generates a plurality of clock signals and a clock selection circuit selects one clock signal among the plurality of clock signals in response to the clock selection signal. The clock selection circuit then outputs the one clock signal as a system clock signal.

14 Claims, 7 Drawing Sheets

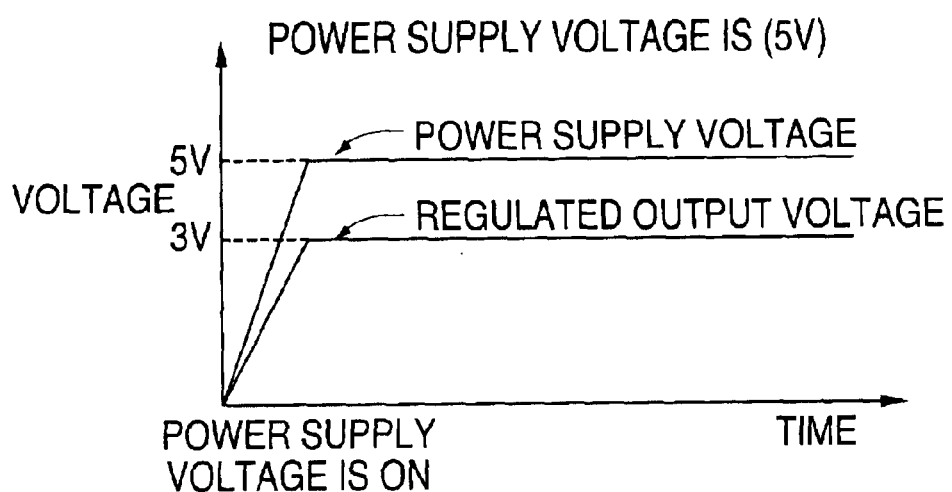
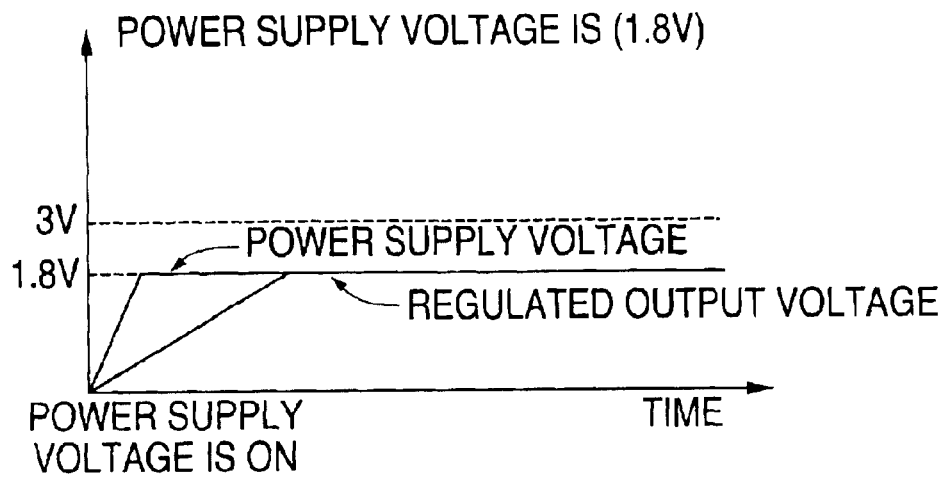

SEMICONDUCTOR CIRCUIT SUPPLIED WITH A VARYING POWER SUPPLY VOLTAGE, AND METHOD FOR OPERATING THE SAME

DESCRIPTION OF THE INVENTION

CROSS REFERENCE RELATED APPLICATION

This application claims the benefit of priority from prior Japanese Patent Application P2001-323881, filed on Oct. 22, 2001, the contents of which are hereby incorporated by reference in their entirety.

FIELD OF THE INVENTION

The present invention relates to a semiconductor integrated circuit and method for operating the same, where the integrated circuit is supplied with a power supply voltage having a varying potential level.

BACKGROUND OF THE INVENTION

In recent years, the miniaturization in large scale integration (LSI) fabrication processes has caused a lowering of the power supply voltage. For example, integrated circuit (IC) cards and subscribers identify module (SIM) cards (an IC card used for a portable information terminal) may have power supply voltages of 5V and 3V, and lately as low as 1.8V. Accordingly, such LSI cards must cope with a wide range of power supply voltages.

While such LSI cards may be designed to be compatible with power supply voltages of 5 V, 3 V, and 1.8 V, those cards generally operate optimally at one clock frequency for a given power supply voltage. When the power supply voltage of the LSI card is lowered, the operating speed of the LSI logic circuit generally decreases. If the operating speed goes too low due to the application of a power supply voltage lower than normal, the logic operation may become unstable, and thus cause the IC card to malfunction.

If the power supply voltage to the LSI then rises (e.g., when first applying the power supply or when recovering from a low power consumption mode or sleep mode), the internal logic circuit may become indeterminate. Again, this may cause the LSI card to become unstable. This is particularly likely when, before the power supply voltage begins to rise, the power supply voltage was low enough to cause a malfunction. In such situations, the circuit components of the IC card begin operating simultaneously before the IC card's voltage regulator or constant voltage generation circuit has a chance to stabilize. The high amount of power required to simultaneously operate these components while the voltage regulator is attempting to stabilize to the new power supply voltage, causes the operation of the regulator to deteriorate.

Accordingly, there is a need for an IC card to be compatible with a power supply voltage having a varying potential level, and to prevent malfunctioning of the IC card when the potential level of the power supply changes.

SUMMARY OF THE INVENTION

In accordance with a first exemplary implementation of the invention, a semiconductor circuit is provided comprising a power supply voltage detection circuit to detect a potential level of an external power supply voltage and to output a detection signal dependent on a comparison of the potential level. A system control circuit detects the detection signal, outputs a status signal and an interrupt signal, and outputs a clock selection signal in response to an operation control signal. A outputs the operation control signal to the system control circuit in response to the status signal and the interrupt signal. A clock generation circuit generates a plurality of clock signals and a clock selection circuit selects one clock signal among the plurality of clock signals in response to the clock selection signal and outputs the one clock signal as a system clock signal.

According to a second exemplary implementation of the invention, a semiconductor circuit is provided, comprising a plurality of circuit components and a regulator to output a predetermined constant voltage as a regulated output voltage when supplied with a first external power supply voltage higher than the predetermined constant voltage. The regulator also outputs a second external power supply voltage as the regulated output voltage when supplied with the second external power supply voltage lower than the predetermined constant voltage. A power-on reset circuit outputs an internal reset signal which remains at a first logic level until the regulated output voltage exceeds a threshold voltage value lower than the second external power supply voltage and becomes a second logic level when the regulated output voltage exceeds the threshold value. A logic circuit computes a logical product of the internal reset signal and an external reset signal and outputs the logical product as a system reset signal. A CPU receives the system reset signal and outputs a low power consumption mode signal. A sequential activation circuit receives the internal reset signal and the low power consumption mode signal, and sequentially outputs enable signals respectively activating the plurality of circuit components. The enable signals are output at different times.

According to a third exemplary implementation of the invention, a semiconductor circuit is provided, comprising a plurality of circuit components and a regulator to output a predetermined constant voltage as a regulated output voltage when supplied with a first external power supply voltage higher than the predetermined constant voltage. The regulator also outputs a second external power supply voltage as the regulated output voltage when supplied with the second external power supply voltage lower than the predetermined constant voltage. A power-on reset circuit outputs an internal reset signal which remains at a first logic level until the regulated output voltage exceeds a threshold voltage value lower than the second external power supply voltage and becomes a second logic level when the regulated output voltage exceeds the threshold value. A logic circuit computes a logical product of the internal reset signal and an external reset signal and outputs the logical product as a system reset signal. A CPU receives the system reset signal and outputs a low power consumption mode signal. A sequential activation circuit receives the internal reset signal and the low power consumption mode signal, and sequentially outputs enable signals respectively activating the plurality of circuit components, wherein the enable signals are output at different times. A power supply voltage detection circuit detects a potential level of an external power supply voltage and outputs a comparison result of the external power supply voltage with a reference voltage as a detection signal. A system control circuit detects the detection signal, outputs a status signal and an interrupt signal, and outputs a clock selection signal in response to an operation control signal. A clock generation circuit generates a plurality of clock signals from a source clock signal. A clock selection circuit selects one clock signal among the plurality of clock signals in response to the clock selection signal and outputs the one clock signal as a system clock signal to the system control circuit, wherein the CPU further outputs the operation control signal to the system control circuit in response to the status signal and the interrupt signal.

According to a fourth exemplary implementation of the invention, a memory card is provided, comprising a card substrate and a semiconductor circuit mounted on the card substrate. The semiconductor circuit has a circuit to generate a plurality of clock signals from a source clock signal and a circuit to select one clock signal among the plurality of clock signals in accordance with a potential level of an external power supply voltage. An external terminal is mounted on the card substrate and a substrate wiring is provided on the card substrate to connect the external terminal and a pad on the semiconductor circuit. Further, a cover film is provided to cover the semiconductor circuit and the card substrate.

According to a fifth exemplary implementation of the invention, a memory card is provided, comprising a card substrate and a semiconductor circuit mounted on the card substrate. The semiconductor circuit has a plurality of circuit components, a regulator which increases an output voltage with time when supplied with an external power supply voltage lower than a normal constant output voltage, and a circuit which sequentially outputs enable signals of a first logic level at different times to sequentially activate the plurality of circuit components when an output of the regulator reaches a threshold value voltage lower than the external power supply voltage. An external terminal is mounted on the card substrate and a substrate wiring is provided on the card substrate to connect the external terminal and a pad on the semiconductor circuit. Further, a cover film is provided for covering the semiconductor circuit and the card substrate.

According to a sixth exemplary implementation of the invention, a method of operating a memory card is provided, comprising: generating a plurality of clock signals from a source clock signal; detecting a potential level of an external power supply voltage supplied from an external circuit and outputting a comparison result of the external power supply voltage with a reference voltage as a detection signal; detecting the detection signal and outputting a status signal and an interrupt signal; outputting an operation control signal in response to the status signal and the interrupt signal; outputting a clock selection signal in response to the operation control signal; and selecting one clock signal among the plurality of clock signals in response to the clock selection signal and outputting the one clock signal as a system clock signal.

According to a seventh exemplary implementation of the invention, a method of operating a memory card is provided, comprising: comparing an external power supply voltage supplied from an external circuit with a normal constant voltage; increasing a regulated output voltage to drive a plurality of circuit components on a semiconductor circuit when the external power supply voltage is lower than the normal constant voltage; and sequentially outputting enable signals at different times which respectively activate the plurality of circuit components when an output voltage of the regulated voltage reaches a specified threshold voltage value lower than the external power supply voltage.

It is to be understood that both the foregoing general description and the following detailed description are exemplary and explanatory only, and should not be considered restrictive of the scope of the invention, as disclosed and claimed herein. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate various embodiments of the present invention, and, together with the description, serve to explain exemplary features of the invention. In the drawings:

FIG. 5 is a diagram illustrates a voltage characteristic of a regulator, consistent with the present invention, supplied with an external power supply voltage of 5V;

FIG. 6 is a diagram illustrating a voltage characteristic of a regulator, consistent with the present invention, supplied with an external power supply voltage of 1.8V;

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts. Further, the drawings are exemplary schematics and are not intended to convey the dimensions or scale of individual parts.

Figure 1:
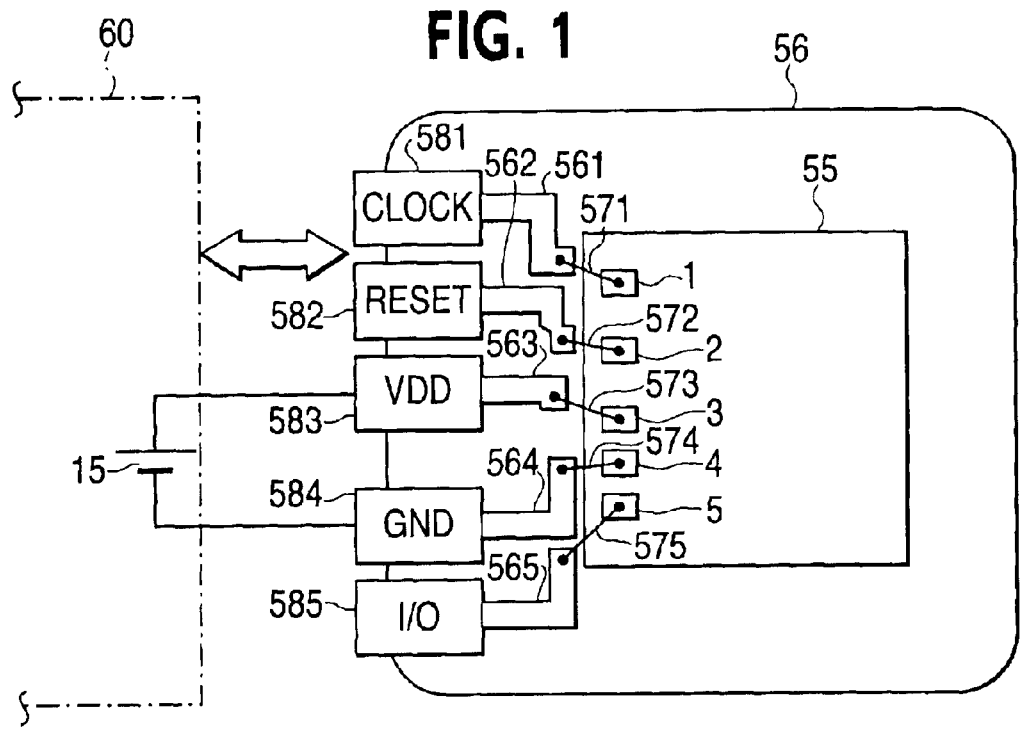
FIG. 1 illustrates an overview of an exemplary IC card consistent with an embodiment of the present invention.

FIG. 1 illustrates an exemplary IC card consistent with an exemplary embodiment of the present invention. Systems and methods consistent with the present invention may be used with any type of IC card, including, for example, a cash card, a credit card, a SIM (Subscribers Identify Module) card, or a USIM (Universal Subscribers Identify Module) card.

As shown in FIG. 1, the IC card includes an LSI chip 55 mounted on an IC card substrate 56. A peripheral portion of the LSI chip 55 may communicate with an external device 60 via several terminal or bonding pads. These terminal pads may include a clock terminal pad 1, a reset terminal pad 2, a power supply (VDD) terminal pad 3, a grounding terminal pad 4, and an input/output terminal pad 5. Through bonding wires 571–575, terminal pads 1–5 are connected to respective substrate wirings 561–565 provided on LSI chip 55.

Alternatively, substrate wirings 561–565 may connect to the terminal pads of LSI chip 55 via solder balls or bumps known to those skilled in the art. The other end of substrate wirings 561–565 may then be respectively connected to, or formed as, a clock terminal 581, a reset terminal 582, a power supply (VDD) terminal 583, a ground terminal 584, and input/output terminal 585. Lead terminals 581–585 may directly contact external device 60, which may perform read/write operations with respect to LSI chip 55. As shown in FIG. 1, external device 60 may further include a power supply 15 for providing power to LSI chip 55 via terminals 583 and 584.

Figure 2:
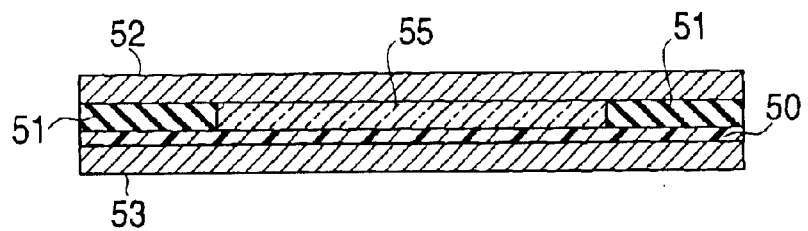
FIG. 2 illustrates a cross-sectional view of an exemplary LSI chip consistent with the present invention.

FIG. 2 illustrates an exemplary cross-sectional view of IC card substrate 56. As shown in FIG. 2, IC card substrate 56 may include a card substrate 50, a spacer 51, an upper cover film 52, and a lower cover film 53. Spacer 51 is adhered to one side of card substrate 50 and may include a hollowed portion for receiving LSI chip 55, which may then be adhered to card substrate 50. Both surfaces of the IC card assembly may be covered with an upper cover film 52 and a lower cover film 53 to sandwich card substrate 50, spacer 51, and LSI chip 55. The IC card assembly of FIG. 2 is exemplary, however, and other structures may be employed for assembling IC card substrate 56.

Figure 3:
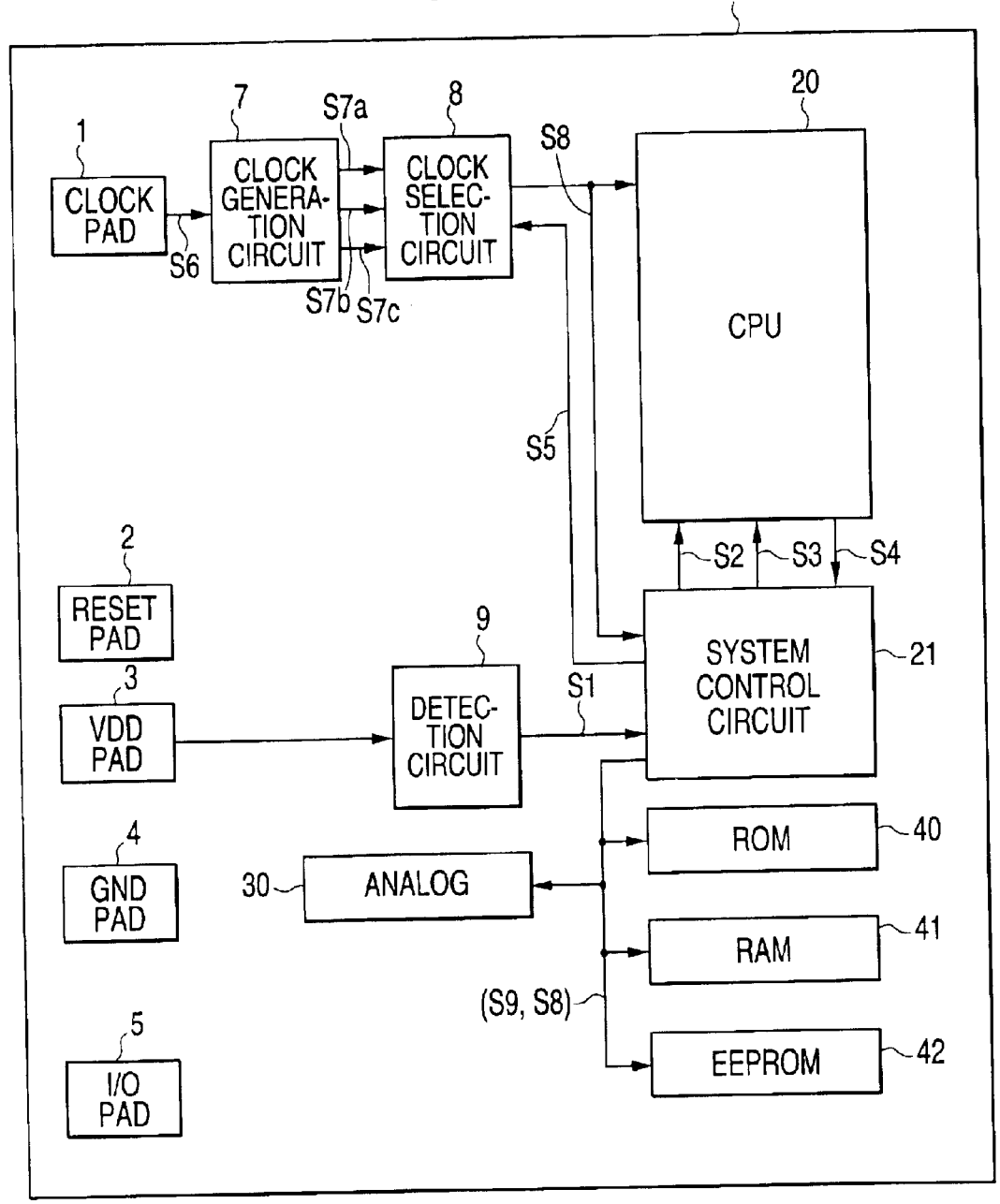
FIG. 3 illustrates a block diagram of an exemplary IC card consistent with a first exemplary embodiment of the present invention.

FIG. 3 illustrates a block diagram of an exemplary LSI chip 55 consistent with a first exemplary embodiment of the present invention. As shown in FIG. 3, the LSI chip 55 may include a clock generation circuit 7, a clock selection circuit 8, a power supply voltage detection circuit 9, a CPU 20, a system control circuit 21, an analog circuit 30, a ROM 40, a RAM 41, and a non-volatile memory 42 (such as an EEPROM).

Power supply voltage detection circuit 9 detects the voltage level of an external power supply voltage applied to power supply terminal pad 3 and outputs a detection signal S1 indicating the potential level of the applied voltage. System control circuit 21 receives detection signal S1 and outputs a status signal S2 and an interrupt signal S3. CPU 20 receives signals S2 and S3 and, in response thereto, outputs an operation control signal S4. Control circuit 21 receives control signal S4 and outputs, to clock selection circuit 8, a clock selection signal S5 based on control signal S4. Control circuit 21 may also communicate with each of the other components of LSI chip 55 to perform control processing for various signals.

CPU 20 may execute or control the processing of LSI chip 55. For instance, CPU 20 may detect a status of the power supply voltage based on status signal S2. CPU 20 may also suspend or interrupt processing operations of LSI chip 55 based on interrupt signal S3. In addition, CPU 20 may output operation control signal S4 based on the value of interrupt signal S3. Further, CPU 20 may control inputs/outputs of clock generation circuit 7, clock selection circuit 8, power supply voltage detection circuit 9, system control circuit 21, analog circuit 30, ROM 40, RAM 41, non-volatile memory 42, and the like.

As shown in FIG. 3, clock terminal pad 1 may receive a clock signal from external device 60 and output a source clock signal S6. Clock generation circuit 7 receives source clock signal S6 and generates from clock signal S6 a plurality of clock signals S7a, S7b, and S7c. Clock selection circuit 8 receives clock signals S7, selects one of them based on clock selection signal S5, and outputs the selected clock signal as system clock signal S8. Reset terminal pad 2 may be connected to CPU 20, control circuit 21, analog circuit 30, and memories 40–42 (via surface wirings not shown) in order to send reset signals to those components. Reset terminal pad 2 may provide the reset signals based on an externally received reset control signal indicating application of a new power supply voltage. Power supply terminal pad 3 and ground terminal pad 4 are connected to receive the input power supply voltage. Power supply voltage detection circuit 9 receives the input power supply voltage from terminal pad 3 and outputs detection signal S1 indicating the detected potential level. Detection circuit 9 may detect one or plural voltages. Input/output terminal pad 5 may include connections (not shown) for data input and data output via the external device 60.

As shown in FIG. 3, LSI chip 55 may also include an analog circuit 30, which may be any type of analog circuit, such as an amplifier. As noted above, LSI chip may also include a number of memory device components. For example, ROM 40 may store programs or software executed by CPU 20, while RAM 41 may store data used by CPU 20 when executing programs stored in ROM 40.

A method for operating LSI chip 55 of FIG. 3, according to an exemplary embodiment of the present invention, will now be described. In this exemplary embodiment, the power supply voltage is VDD and the reference voltages are V1 and V2, with V1<V2. As described below, reference voltages V1 and V2 may be used for indicating the potential level of the power supply voltage.

Based on the source clock signal S6 received from clock terminal pad 1, clock generation circuit 7 may generate the plurality of clock signals S7 for outputting to clock selection circuit 8. In one exemplary embodiment of LSI chip 55 consistent with the present invention, the plurality of generated clock signals S7a, S7b, and S7c may have respective frequencies f1, f2, and f3, such that f1<f2<f3. Clock selection circuit 8 selects one of clock signals S7a, S7b, and S7c based on clock selection signal S5 received from system control circuit 21. Clock selection circuit 8 then sends the selected clock signal, as the system clock signal S8, to CPU 20 and system control circuit 21. As shown in FIG. 3, system control circuit 21 may further output the system clock signal S8 to the other circuit components, such as analog circuit 30, ROM 40, RAM 41, and non-volatile memory 42.

When reset terminal pad 2 receives an external reset signal, clock selection circuit 8 may select the clock signal S7a having the lowest frequency f1. Accordingly, selection circuit 8 may then output clock signal S7a as the system clock signal S8 to CPU 20 and system control circuit 21, as described above. Regardless of the selected clock signal, CPU 20 may output operation control signal S4 to system control circuit 21 in response to system clock signal S8 received from clock selection circuit 8. Further, control circuit 21 then performs processing operations known to those skilled in the art in response to system clock signal S8 received from clock selection circuit 8.

During the above operation of clock selection circuit 8, external power supply 15 of external device 60 supplies a power supply voltage VDD to terminal pad 3 via, for example, terminal 583, wiring 563, and bonding wire 573. Upon detecting a potential level of the power supply voltage VDD at terminal pad 3, power supply voltage detection circuit 9 compares the voltage VDD with reference voltages V1 and V2. Detection circuit 9 outputs the result of this comparison as the detection signal S1 to system control circuit 21. Detection signal S1 indicates the potential level of voltage VDD, e.g., by indicating its potential level in relation to the reference voltages V1 and V2 (e.g., whether V2>VDD>V1, whether VDD>V2, or whether VDD<V1).

Based on detection signal S1, system control circuit 21 detects a status of the power supply voltage received from voltage detection circuit 9 and outputs to CPU 20 the status of the power supply voltage as the status signal S2. Status signal S2 may indicate the current value or presence of the power supply voltage. If the status of the power supply voltage changes, control circuit 21 also outputs interrupt signal S3 to CPU 20.

Based on the status of the power supply voltage indicated by status signal S2, CPU 20 outputs operation control signal S4 to system control circuit 21. In accordance with control signal S4, control circuit 21 outputs clock selection signal S5 for causing clock selection circuit 8 to select one of clock signals S7. For example, control circuit 21 may require selection circuit 8 to select clock signal S7c with frequency f3 when VDD>V2, to select clock signal S7b with frequency f2 when V2>VDD>V1, or to select clock signal S7a with frequency f1 when VDD<V1. Moreover, when interrupt signal S3 indicates a change in the power supply voltage, CPU 20 may output operation control signal S4 to system control circuit 21 to cause circuit 8 to temporarily select the clock signal having the lowest frequency; here, clock signal S7a having frequency f1. After the power supply voltage stabilizes, CPU 20 may cause the clock signal to be selected based on the actual value of power supply VDD. For example, as described above, if power supply voltage VDD becomes V2>VDD>V1, then CPU 20 outputs operation control signal S4 to control circuit 21 to cause selection of clock signal S7b having frequency f2.

System control circuit 21 outputs clock selection signal S5 to clock selection circuit 8 in response to operation control signal S4 received from CPU 20. Also, in response to signal S4, system control circuit 21 may output operation control signal S9 to the other circuit components of LSI chip 55, such as analog circuit 30, ROM 40, RAM 41, and non-volatile memory 42, which then perform various processing operations based on control signal S9.

An LSI for an IC card consistent with the present invention may, therefore, select an optimal frequency for the system clock signal due to a change in the power supply voltage. By operating components of the IC card at the clock frequency optimal for the received power supply voltage, malfunctioning of the IC card may be prevented while still performing voltage operations at low power consumption.

Figure 4:
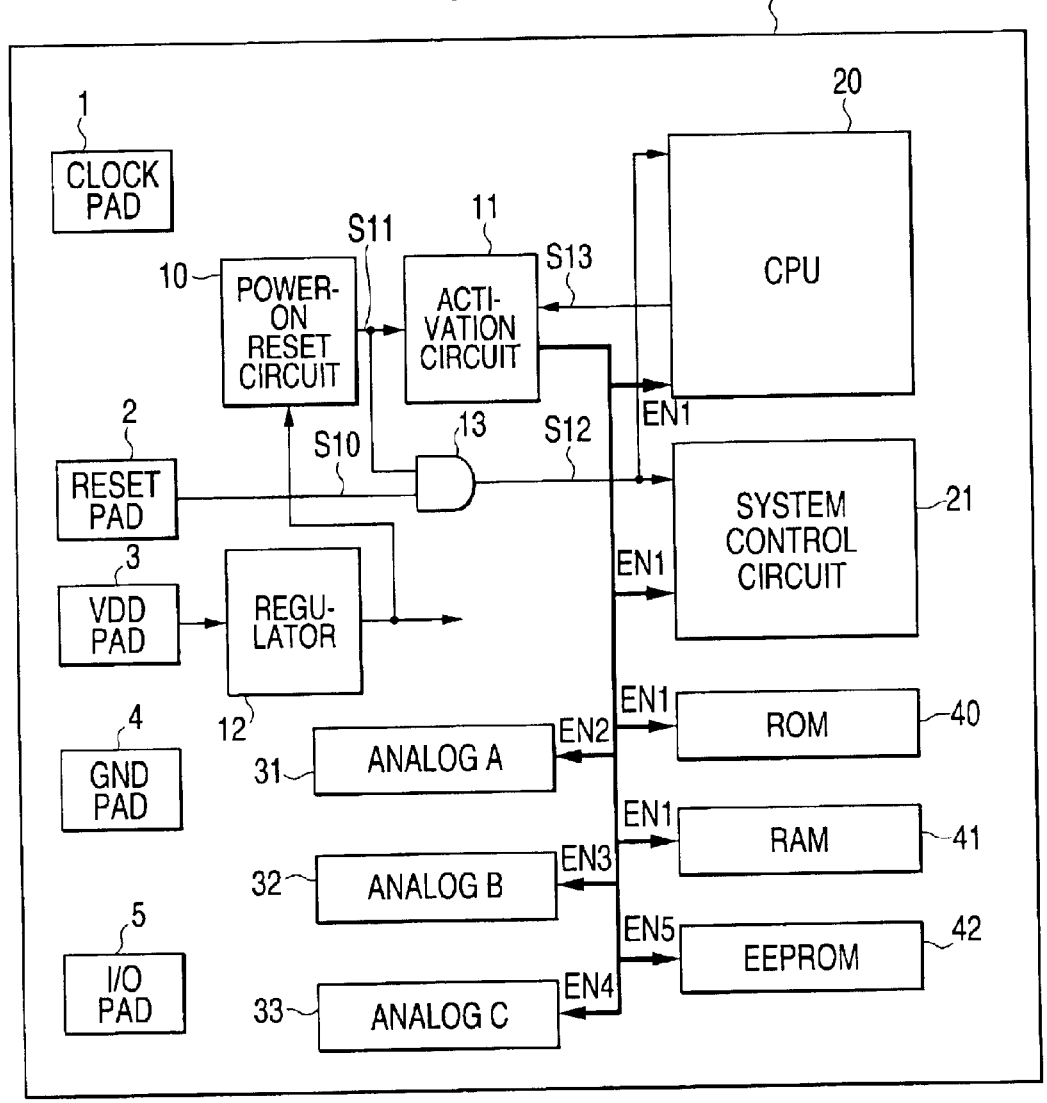
FIG. 4 illustrates a block diagram of an exemplary IC card consistent with a second exemplary embodiment of the present invention.

FIG. 4 illustrates an LSI chip 55 according to a second exemplary embodiment of the present invention. The LSI chip of FIG. 4 is similar to that of FIG. 3, but includes a power-on reset circuit 10, a sequential activation circuit 11, a regulator 12, a logic circuit 13, and three analog circuits 31–33. Further, as opposed to the embodiment of FIG. 3, the embodiment of FIG. 4 need not include clock generation circuit 7, clock selection circuit 8, or power supply voltage detection circuit 9. Since the components of LSI chip 55 common to both FIGS. 3 and 4 are described above, they will be described only briefly below.

As shown in FIG. 4, power-on reset circuit 10 is connected to regulator 12 and monitors the external power supply voltage to generate an internal reset signal S11 when an external power is applied. Sequential activation circuit 11 is connected to power-on reset circuit 10 and includes a counter to control the processing operations of the circuit components within LSI chip 55. Regulator 12 is connected to power supply terminal pad 3 and converts the external power supply voltage received from terminal pad 3 into a constant voltage that it supplies to the other circuit components of LSI chip 55. In LSI chips 55 consistent with the invention, regulator 12 may output more than one constant voltage value. For instance, in the exemplary embodiments below, regulator 12 may output constant voltages of 5V and 3V. Logic circuit 13 receives internal reset signal S11 from reset circuit 10 and an external reset signal S10 from reset terminal pad 2 and outputs the logical product of the two reset signals as a system reset signal S12. Logic circuit 13 outputs system reset signal S12 to CPU 20 and system control circuit 21. As shown in FIG. 4, logic circuit 13 may be implemented by using a logical AND gate.

CPU 20 may control the inputs and outputs of power-on reset circuit 10, sequential activation circuit 11, regulator 12, logic circuit 13, system control circuit 21, the analog circuit A 31, the analog circuit B 32, the analog circuit C 33, the ROM 40, the RAM 41, the non-volatile memory 42, and the like, respectively. System control circuit 21 is connected to each of the circuit components in LSI card 55 and performs control processing for various signals. Analog circuits 31–33 may represent any type of analog circuit, such as analog amplifiers.

As described above, regulator 12 receives the external power supply voltage via terminal pad 3. When LSI chip 55 is supplied with an external power supply voltage higher than a constant voltage normally output by regulator 12, regulator 12 generates a regulator output voltage based on the external power supply voltage. If the external power supply voltage is lower than the normal constant voltage, however, power-on reset circuit 10 outputs an internal reset signal S11 until the output voltage of regulator 12 exceeds a specified threshold voltage value, which may be lower than the external power supply voltage. When reset signal S11 indicates that the regulator output voltage exceeds the specified threshold voltage, then sequential activation circuit 11 may sequentially output enable signals to sequentially activate the other circuit components of LSI card 55.

FIGS. 5 and 6 illustrate regulator voltage characteristics, consistent with the invention, when regulator 12 may normally generates a constant voltage of 3V. FIG. 5 is a diagram showing a regulator characteristic when an external power supply voltage (e.g., 5V) is higher than the voltage normally output by regulator 12 (e.g., 3V). As shown in FIG. 5, upon receiving the supply voltage of 5V, regulator 12 follows the external power supply voltage (for several $\mu$s or less) and generates the normal constant voltage (3V) as a regulator output.

FIG. 6 is a diagram showing a regulator characteristic when the external power supply voltage (e.g., 1.8V) is lower than the voltage normally output by regulator 12 (e.g., 3V). As shown in FIG. 6, upon being applied with the external power supply voltage of 1.8V, regulator 12 outputs the external power supply voltage as an externally dependent constant voltage (e.g., 1.8V). In this case, as shown in FIG. 6, though the output of regulator 12 gradually increases with time, a certain amount of time passes (e.g., between 10 $\mu$s to 1 ms) before the regulator output stabilizes at 1.8V. As compared to the case shown in FIG. 5 where the external power supply voltage is above the normal constant voltage (e.g., 3V), the rise time of the regulator output is slower than when the external power supply voltage is below the normal constant voltage (e.g., 3V).

Described below is a method of operating LSI chip 55 shown in FIG. 4, according to an exemplary embodiment of the present invention. More specifically, the processing operations below refer to the following two types of situations: when applying a power supply voltage, and when recovering from a low power consumption mode or sleep mode. In the second situation, the low power consumption mode or sleep mode implies that the operation of the internal circuit is put in a halt condition to achieve low power consumption. More specifically, in the sleep mode, the external power supply voltage is lower than the normal constant voltage of regulator 12.

In the first exemplary situation, when first applying a power supply voltage, external power supply 15 supplies the power supply voltage VDD to terminal pad 3 through, for example, the VDD terminal 583, the substrate wiring 563 and the bonding wire 573. Regulator 12 then detects the potential level of the power supply voltage VDD at the power supply terminal pad 3. Upon doing so, regulator 12 may gradually turn on with time so as to generate a specified externally dependent constant voltage from the power supply voltage VDD. Regulator 12 outputs the regulated output voltage to power-on reset circuit 10.

Figure 7:
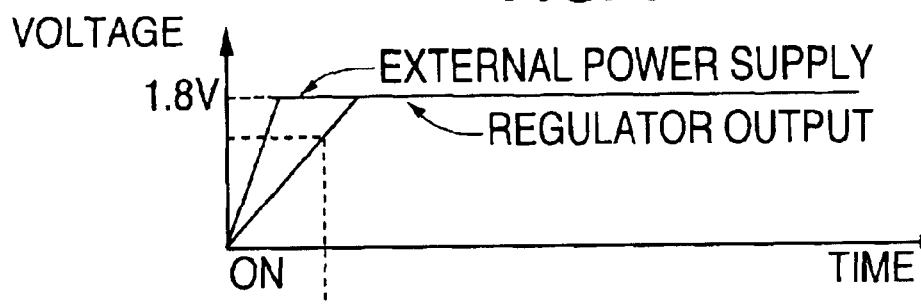
FIG. 7 is a diagram showing an exemplary process operation, consistent with the present invention, when applying a power supply voltage of 1.8V.

As shown in FIG. 7, power-on reset circuit 10 outputs an internal reset signal S11 of a lower logic level (logic "0") to sequential activation circuit 11 and logic circuit 13 until the regulated output voltage exceeds a specified threshold voltage value. Once the regulated output exceeds this threshold value, reset circuit 10 performs an internal reset function by setting reset signal S11 to an upper logic level (logic "1"). Meanwhile, from reset terminal pad 2, external reset signal S10 of logic "1" is output to logic circuit 13 for indicating the application of a new power supply voltage. Logic circuit 13 then produces a logical product of internal reset signal S11 output from power-on reset circuit 10 and external reset signal S10 output from reset terminal pad 2. Logic circuit 13 outputs the logic product as the system reset signal S12 to CPU 20 and system control circuit 21. When internal reset signal S11 and external reset signal S10 are both of logic "1", logic circuit 13 outputs a system reset signal S12 of logic "1".

Since the sleep mode is not set in this exemplary situation, CPU 20 outputs the low power consumption mode signal S13 of logic "1" to sequential activation circuit 11. Sequential activation circuit 11 detects the activation of the internal reset by monitoring the low power consumption mode signal S13 and internal reset signal S11. The low power consumption mode signal S13 may be monitored here to prevent activation circuit 11 from detecting activation of the internal reset when the sleep mode is set. As shown in FIGS. 4 and 7, by use of an internal counter (not shown), sequential activation circuit 11 then sequentially outputs enable signals EN1, EN2, . . . and EN5 of logic "1", having different rise times, to CPU 20, system control circuit 21, analog circuit A 31, analog circuit B 32, analog circuit C 33, ROM 40, RAM 41, non-volatile memory 42, and the like, to sequentially activate those components. As a result of receiving enable signals EN, the respective circuit components begin processing operations at timings different from one another.

Figure 8:
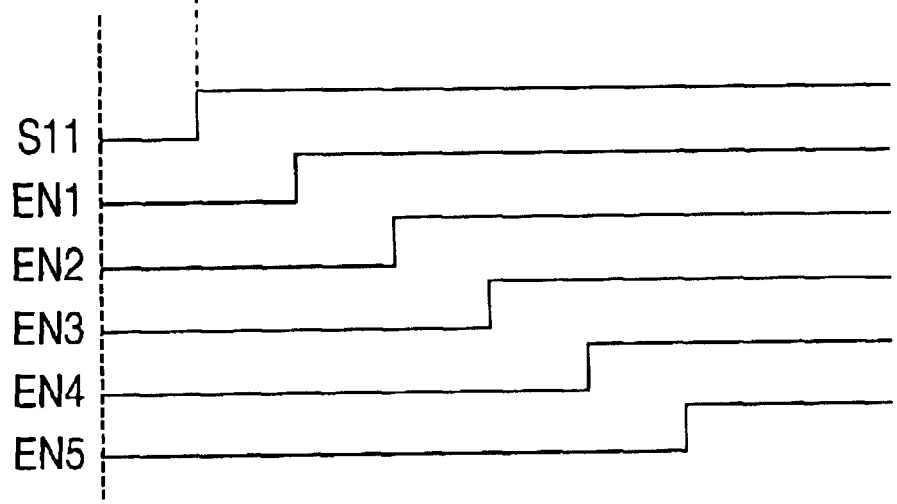
FIG. 8 is a diagram showing an exemplary process operation, consistent with the present invention, after recovering from a low power consumption mode when supplied with a power supply voltage of 1.8V.

The second exemplary situation will now be described. In this second exemplary situation, LSI card 55 of FIG. 4 recovers from a sleep mode. Here, as shown in FIG. 8, internal reset signal S11 may be assumed to be at a logic "1". Therefore, logic circuit 13 outputs system reset signal S12 of logic "1" to CPU 20 and system control circuit 21. When the low power consumption mode ends, low power consumption mode signal S13 returns to logic "1". Accordingly, CPU 20 outputs signal S13 of logic "1" to sequential activation circuit 11, which detects the ending of the low power consumption mode based on signals S13 and S11.

Then, as shown in FIGS. 4 and 8, by use of an internal counter (not shown), sequential activation circuit 11 sequentially outputs enable signals EN1, EN2, . . . and EN5 of logic "1" and having different rise times. Activation circuit 11 outputs the enable signals EN1–5 to CPU 20, system control circuit 21, analog circuit A 31, analog circuit B 32, analog circuit C 33, ROM 40, RAM 41, and non-volatile memory 42, respectively, to sequentially activate those components within a certain interval of time from receiving the respective enable signal. As a result of receiving enable signals EN, the circuit components begin processing operations at timings different from one another.

Accordingly, when the external power supply voltage is low (e.g., when applying the power supply or when recovering from the low power consumption mode), large amounts of power need not be consumed and a load on the regulator at startup can be decreased. As described above, power is conserved by sequentially activating the circuit components at different times. Since the stabilized constant voltage can thus be supplied to the respective circuit components, it is possible to stabilize the operations of the circuit components.

Figure 9:
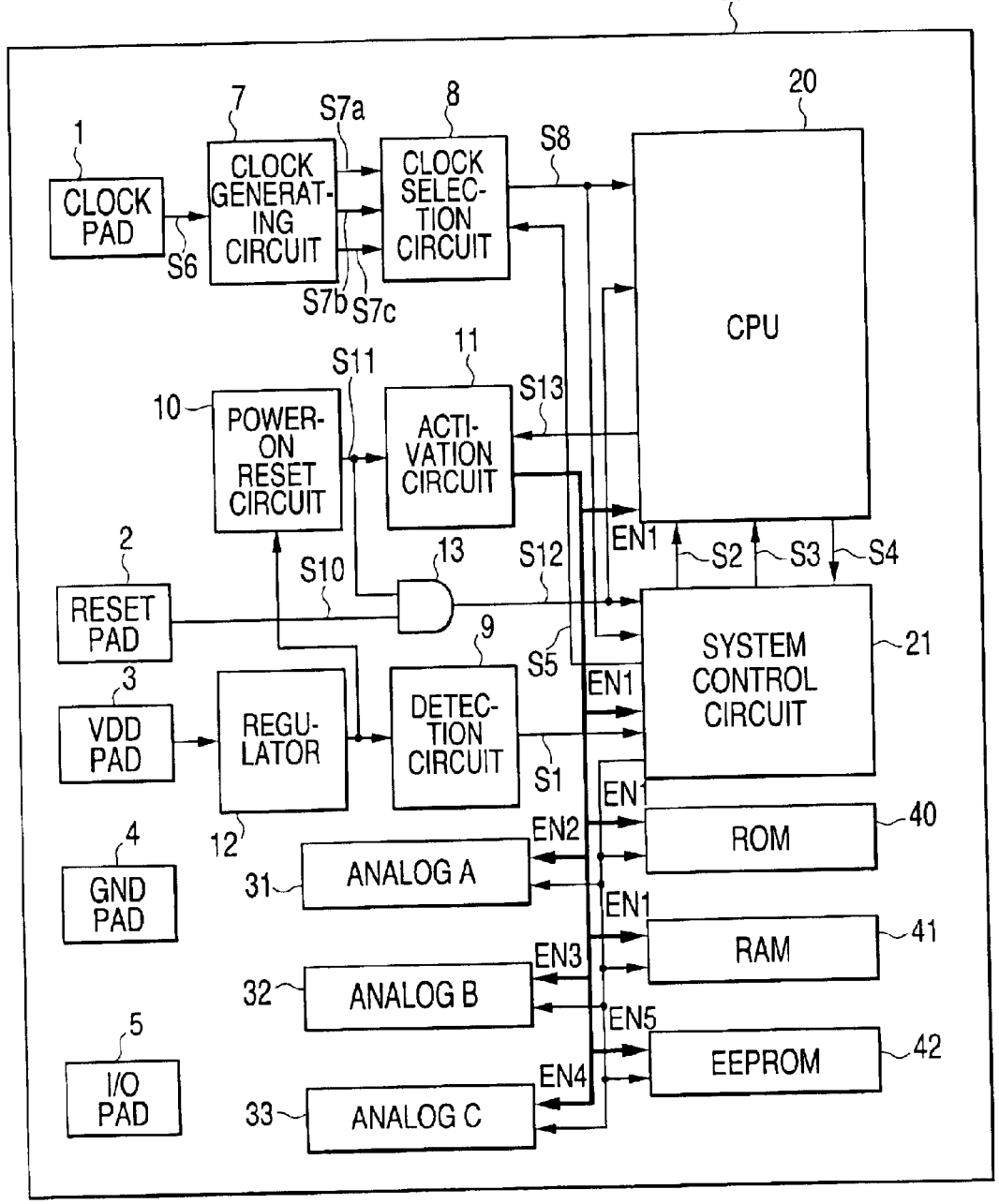
FIG. 9 illustrates a block diagram of an exemplary IC card consistent with a third exemplary embodiment of the present invention.

FIG. 9 illustrates an LSI 55 for an IC card according to a third exemplary embodiment of the present invention, which is a combination of the embodiments illustrated in FIGS. 3 and 4. Since the components of LSI chip shown in FIG. 9 are described above with respect to FIGS. 3 and 4, they will only be described briefly below.

The exemplary embodiment of FIG. 9 differs from those of FIGS. 3 and 4 in that power supply voltage detection circuit 9 is connected to the output of regulator 12, rather than to power supply (VDD) terminal pad 3. More specifically, as shown in FIG. 9, power supply (VDD) terminal pad 3 is connected to regulator 12, which outputs the regulated output voltage to power supply voltage detection circuit 9. As described above with respect to FIG. 3, detection circuit 9 detects the applied external power supply voltage and outputs, to control circuit 21, the detected voltage as the detection signal S1.

A method, consistent with the present invention, for operating LSI 55 shown in FIG. 9 will now be described. In this exemplary embodiment, the power supply voltage is VDD and the reference voltages are V1 and V2, with V1<V2.

First, external power supply 15 of external device 60 supplies a power supply voltage VDD to terminal pad 3 via, for example, terminal 583, wiring 563, and bonding wire 573. Regulator 12 then detects the voltage level of the power supply voltage VDD at the power supply terminal pad 3. Upon doing so, regulator 12 may gradually turn on with time so as to generate a specified externally dependent constant voltage from the power supply voltage VDD. Regulator 12 then outputs this constant voltage as the regulator output voltage to power-on reset circuit 10 and to power supply voltage detection circuit 9. Upon detecting a voltage level of the regulator output voltage, power supply voltage detection circuit 9 compares the regulator output voltage with reference voltages V1 and V2. Detection circuit 9 outputs the result of this comparison as the detection signal S1 to the system control circuit 21.

Meanwhile, power-on reset circuit 10 outputs an internal reset signal S11 of logic "0" to sequential activation circuit 11 and logic circuit 13 until the regulated output voltage exceeds a specified threshold voltage value. Once the regulated output exceeds this threshold value, reset circuit 10 performs an internal reset function by setting reset signal S11 to logic "1". Meanwhile, from the reset terminal pad 2, external reset signal S10 of logic "1" is output to logic circuit 13. Logic circuit 13 then produces a logical product of internal reset signal S11 output from power-on reset circuit 10 and external reset signal S10 output from reset terminal pad 2. Logic circuit 13 outputs the logical product as the system reset signal S12 to CPU 20 and system control circuit 21. When internal reset signal S11 and external reset signal S10 are both of logic "1", logic circuit 13 outputs a system reset signal S12 of logic "1".

Since the low power consumption mode is not set in this example, CPU 20 outputs the low power consumption mode signal S13 of logic "1" to sequential activation circuit 11. Sequential activation circuit 11 detects the activation of the internal reset by monitoring low power consumption mode signal S13 and internal reset signal S11, as described above. Then, as shown in FIG. 9, sequential activation circuit 11 uses an internal counter (not shown) to sequentially output enable signals EN1, EN2, . . . and EN5 of logic "1", having different rise times, to CPU 20, system control circuit 21, analog circuits 31–33, ROM 40, RAM 41, non-volatile memory 42, and the like, to sequentially activate those components.

Meanwhile, based on the source clock signal S6 received from clock terminal pad 1, clock generation circuit 7 may generate the plurality of clock signals S7 for outputting to clock selection circuit 8. In one exemplary embodiment, the plurality of generated clock signals S7a, S7b, and S7c may have respective frequencies f1, f2, and f3, such that f1<f2<f3. Clock selection circuit 8 selects one of clock signals S7a, S7b, and S7c based on clock selection signal S5 received from system control circuit 21. Clock selection circuit 8 then sends the selected clock signal, as the system clock signal S8, to CPU 20 and system control circuit 21. As shown in FIG. 9, system control circuit 21 may further output system clock signal S8 to the other circuit components, such as analog circuits 31–33, ROM 40, RAM 41, and non-volatile memory 42.

When reset terminal pad 2 receives an external reset signal, clock selection circuit 8 may select the clock signal S7a having the lowest frequency f1. Accordingly, selection circuit 8 may then output clock signal S7a as the system clock signal S8 to CPU 20 and system control circuit 21, as described above. In either event, CPU 20 outputs operation control signal S4 to system control circuit 21 in response to system clock signal S8 received from clock selection circuit 8. Further, system control circuit 21 may then perform processing operations known to those skilled in the art, in response to system clock signal S8 received from clock selection circuit 8.

Based on detection signal S1, system control circuit 21 detects a status of the power supply voltage received from power supply voltage detection circuit 9 and outputs to CPU 20 the status of the power supply voltage as status signal S2. If the status of the power supply changes, control circuit 21 may output interrupt signal S3 to CPU 20 to indicate a change in the power supply.

Based on the status of the power supply voltage indicated by status signal S2, CPU 20 outputs operation control signal S4 to system control circuit 21. As described above, according to control signal S4, control circuit 21 may cause clock selection circuit 8 to select clock signal S7c with frequency f3 when VDD>V2, to select clock signal S7b with frequency f2 when V2>VDD>V1, or to select clock signal S7a with frequency f1 when VDD<V1. Moreover, when interrupt signal S3 indicates a change in the power supply voltage, CPU 20 may output operation control signal S4 to system control circuit 21 to cause a temporary selection of clock signal S7a having frequency f1. After the power supply voltage stabilizes, CPU 20 may cause the clock signal to be selected based on the actual value of VDD. For example, as described above, if power supply voltage VDD becomes V2>VDD>V1, then CPU 20 outputs operation control signal S4 to control circuit 21 to cause selection of clock signal S7b having frequency f2.

System control circuit 21 outputs clock selection signal S5 to clock selection circuit 8 in response to operation control signal S4 received from CPU 20. Also, in response to signal S4, system control circuit 21 may output operation control signal S9 to the other circuit components of LSI 55, such as analog circuits 31–33, ROM 40, RAM 41, and non-volatile memory 42, which then perform various known processing operations based on control signal S9.

Accordingly, an IC card consistent with the present invention may reduce power consumption during periods when the external power supply voltage is low (e.g., when first applying the power supply or when recovering from a low power consumption mode), thereby decreasing the load on the regulator during a startup operation. The decreased load on the regulator allows it to output a stable constant voltage to the other circuit components of the IC card. As a result, the internal circuit components of the IC card are not prone to instability. Furthermore, an IC card consistent with the invention may select a system clock signal having an optimal frequency based on the status of the power supply voltage.

Figure 10:
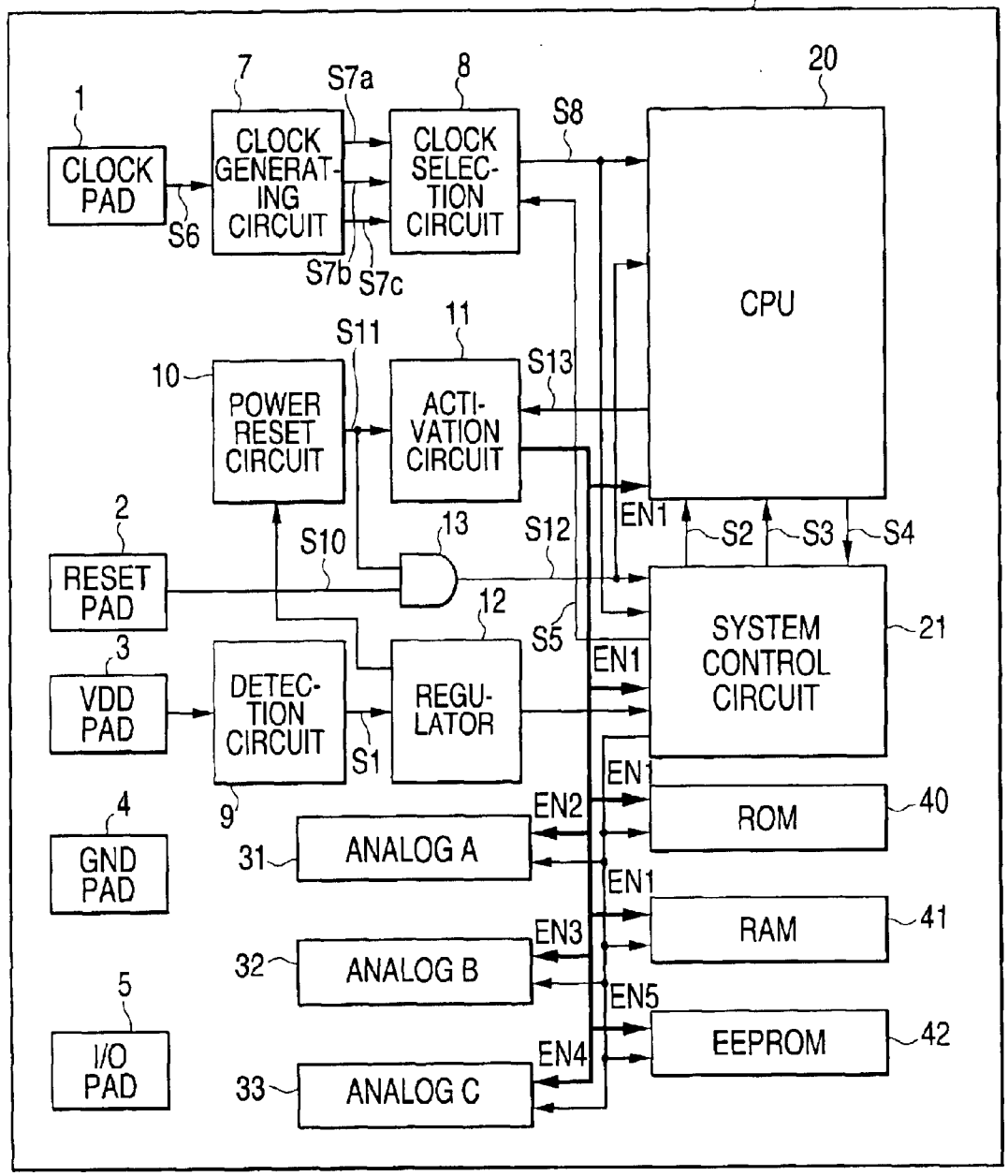
FIG. 10 illustrates a block diagram of an exemplary IC card consistent with a fourth exemplary embodiment of the present invention.

FIG. 10 illustrates an LSI 55 for an IC card according to a fourth embodiment of the present invention, which is a further alternative combination of the embodiments illustrated in FIGS. 3 and 4. Since the components of LSI chip shown in FIG. 10 are described above with respect to FIGS. 3, 4 and 9, they will only be described briefly below. The exemplary embodiment of FIG. 10 differs from that of FIG. 9 in that power supply voltage detection circuit 9 is connected between power supply (VDD) terminal pad 3 and regulator 12.

A method, consistent with the present invention, for operating LSI 55 shown in FIG. 10 will now be described. Here again, the power supply voltage is VDD and the reference voltages are V1 and V2, with V1<V2.

First, external power supply 15 of external device 60 supplies a power supply voltage VDD to terminal pad 3 via, for example, terminal 583, wiring 563, and bonding wire 573. Upon detecting a voltage level of the power supply voltage VDD at terminal pad 3, power supply voltage detection circuit 9 compares the voltage VDD with reference voltages V1 and V2. Detection circuit 9 outputs the result of this comparison as the detection signal S1 to system control circuit 21 via regulator 12. Detection signal S1 indicates the value of voltage VDD in relation to the reference voltages V1 and V2 (e.g., whether V2>VDD>V1, whether VDD>V2, or whether VDD<V1). Regulator 12 then detects the voltage level of the power supply voltage VDD via detection circuit 9. Upon doing so, regulator 12 may gradually turn on with time so as to generate a specified externally dependent constant voltage from the power supply voltage VDD. Regulator 12 then outputs this constant voltage as the regulator output voltage to power-on reset circuit 10.

Meanwhile, power-on reset circuit 10 outputs an internal reset signal S11 of logic "0" to sequential activation circuit 11 and logic circuit 13 until the regulated output voltage exceeds a specified threshold voltage value. Once the regulated output exceeds this threshold value, reset circuit 10 performs an internal reset function by setting reset signal S11 to logic "1". Meanwhile, from the reset terminal pad 2, external reset signal S10 of logic "1" is output to logic circuit 13. Logic circuit 13 then produces a logical product of internal reset signal S11 output from power-on reset circuit 10 and external reset signal S10 output from reset terminal pad 2. Logic circuit 13 outputs the logical product as the system reset signal S12 to CPU 20 and system control circuit 21. When internal reset signal S11 and external reset signal S10 are both of logic "1", logic circuit 13 outputs a system reset signal S12 of logic "1".

Since the low power consumption mode is not set in this example, CPU 20 outputs the low power consumption mode signal S13 of logic "1" to sequential activation circuit 11. Sequential activation circuit 11 detects the activation of the internal reset by monitoring low power consumption mode signal S13 and internal reset signal S11, as described above. Then, as shown in FIG. 10, sequential activation circuit 11 uses an internal counter (not shown) to sequentially output enable signals EN1, EN2, ... and EN5 of logic "1", having different rise times, to CPU 20, system control circuit 21, analog circuits 31–33, ROM 40, RAM 41, non-volatile memory 42, and the like, to sequentially activate those components.

Meanwhile, based on the source clock signal S6 received from clock terminal pad 1, clock generation circuit 7 may generate the plurality of clock signals S7 for outputting to clock selection circuit 8. In one exemplary embodiment, the plurality of generated clock signals S7a, S7b, and S7c may have respective frequencies f1, f2, and f3, such that f1<f2<f3. Clock selection circuit 8 selects one of clock signals S7a, S7b, and S7c based on clock selection signal S5 received from system control circuit 21. Clock selection circuit 8 then sends the selected clock signal, as the system clock signal S8, to CPU 20 and system control circuit 21. As shown in FIG. 10, system control circuit 21 may further output system clock signal S8 to the other circuit components, such as analog circuits 31–33, ROM 40, RAM 41, and non-volatile memory 42.

When reset terminal pad 2 receives an external reset signal, clock selection circuit 8 may select the clock signal S7a having the lowest frequency f1. Accordingly, selection circuit 8 may then output clock signal S7a as the system clock signal S8 to CPU 20 and system control circuit 21, as described above. In either event, CPU 20 outputs operation control signal S4 to system control circuit 21 in response to system clock signal S8 received from clock selection circuit 8. Further, system control circuit 21 may then perform processing operations known to those skilled in the art, in response to system clock signal S8 received from clock selection circuit 8.

Based on detection signal S1, system control circuit 21 detects a status of the power supply voltage received from power supply voltage detection circuit 9 and outputs to CPU 20 the status of the power supply voltage as status signal S2. If the status of the power supply changes, control circuit 21 may output interrupt signal S3 to CPU 20 to indicate a change in the power supply.

Based on the status of the power supply voltage indicated by status signal S2, CPU 20 outputs operation control signal S4 to system control circuit 21. As described above, according to control signal S4, control circuit 21 may cause clock selection circuit 8 to select clock signal S7c with frequency f3 when VDD>V2, to select clock signal S7b with frequency f2 when V2>VDD>V1, or to select clock signal S7a with frequency f1 when VDD<V1. Moreover, when interrupt signal S3 indicates a change in the power supply voltage, CPU 20 may output operation control signal S4 to system control circuit 21 to cause a temporary selection of clock signal S7a having frequency f1. After the power supply voltage stabilizes, CPU 20 may cause the clock signal to be selected based on the actual value of VDD. For example, as described above, if power supply voltage VDD becomes V2>VDD>V1, then CPU 20 outputs operation control signal S4 to control circuit 21 to cause selection of clock signal S7b having frequency f2.

System control circuit 21 outputs clock selection signal S5 to clock selection circuit 8 in response to operation control signal S4 received from CPU 20. Also, in response to signal S4, system control circuit 21 may output operation control signal S9 to the other circuit components of LSI 55, such as analog circuits 31–33, ROM 40, RAM 41, and non-volatile memory 42, which then perform various known processing operations based on control signal S9.

The respective circuit blocks such as the system control circuit 21, the analog circuit 30, the ROM 40, the RAM 41 and the non-volatile memory 42 perform the processing operations in response to the system clock signal S8 inputted from the clock selection circuit 8.

As described above, an IC card consistent with the present invention may stabilize the operations of the internal circuit components based on the status of the power supply voltage. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A memory card, comprising:
   a card substrate;
   a semiconductor circuit mounted on the card substrate, the semiconductor circuit having a circuit to generate a plurality of clock signals from a source clock signal and a circuit to select one clock signal among the plurality of clock signals in accordance with a potential level of an external power supply voltage;
   an external terminal mounted on the card substrate;
   a substrate wiring provided on the card substrate to connect the external terminal and a pad on the semiconductor circuit; and
   a cover film to cover the semiconductor circuit and the card substrate.

2. The semiconductor circuit of claim 1, wherein the circuit to select one clock signal among the plurality of clock signals selects, based on an external reset signal, a clock signal of a lowest frequency among the plurality of clock signals and outputs the clock signal as a system clock signal.

3. The semiconductor circuit of claim 1, wherein the external power supply voltage has a varying potential level.

4. The semiconductor circuit of claim 1, wherein the memory card comprises at least one of an IC card, a credit card, an SIM card, and a USIM card.

5. A memory card, comprising:
   a card substrate;
   a semiconductor circuit mounted on the card substrate, the semiconductor circuit having:
      a plurality of circuit components,
      a regulator which increases an output voltage with time when supplied with an external power supply voltage lower than a normal constant output voltage, and
      a circuit which sequentially outputs enable signals of a first logic level at different times to sequentially activate the plurality of circuit components when an output of the regulator reaches a threshold value voltage lower than the external power supply voltage;

an external terminal mounted on the card substrate;

a substrate wiring provided on the card substrate connecting the external terminal and a pad on the semiconductor circuit; and a cover film for covering the semiconductor circuit and the card substrate.

6. The memory card of claim 5, wherein the semiconductor circuit further includes:

a circuit to generate a plurality of clock signals from a source clock signal; and a circuit to select one clock signal among the plurality of clock signals in accordance with a potential level of the external power supply voltage.

7. The semiconductor circuit of claim 5, wherein the memory card comprises at least one of an IC card, a credit card, an SIM card, and a USIM card.

8. A method of operating a memory card, comprising:

generating a plurality of clock signals from a source clock signal;

detecting a potential level of an external power supply voltage supplied from an external circuit and outputting a comparison result of the external power supply voltage with a reference voltage as a detection signal;

detecting the detection signal and outputting a status signal and an interrupt signal;

outputting an operation control signal in response to the status signal and the interrupt signal;

outputting a clock selection signal in response to the operation control signal; and selecting one clock signal among the plurality of clock signals in response to the clock selection signal and outputting the one clock signal as a system clock signal.

9. The method of claim 8, wherein the selecting one clock signal among the plurality of clock signals selects, based on an external reset signal, a clock signal of a lowest frequency among the plurality of clock signals and outputs the clock signal as the system clock signal.

10. The method of claim 8, wherein the external power supply voltage has a varying potential level.

11. The method of claim 8, wherein the memory card comprises at least one of an IC card, a credit card, an SIM card, and a USIM card.

12. A method of operating a memory card, comprising:

comparing an external power supply voltage supplied from an external circuit with a normal constant voltage;

increasing a regulated output voltage to drive a plurality of circuit components on a semiconductor circuit when the external power supply voltage is lower than the normal constant voltage; and sequentially outputting enable signals at different times which respectively activate the plurality of circuit components when an output voltage of the regulated voltage reaches a specified threshold voltage value lower than the external power supply voltage.

13. The method of claim 12, further comprising:

generating a plurality of clock signals from a source clock signal;

the external circuit and outputting a comparison result of the external power supply voltage with a reference voltage as a detection signal;

detecting the detection signal and outputting a status signal and an interrupt signal;

outputting an operation control signal in response to the status signal and the interrupt signal;

outputting a clock selection signal in response to the operation control signal; and selecting one clock signal among the plurality of clock signals in response to the clock selection signal and outputting the one clock signal as a system clock signal.

14. The method of claim 13, wherein the memory card comprises at least one of an IC card, a credit card, an SIM card, and a USIM card.

* * * * *